· US007305820B2

United States Patent
Miyashita

(10) Patent No.: US 7,305,820 B2
(45) Date of Patent: Dec. 11, 2007

(54) EXHAUST GAS CONTROL APPARATUS FOR INTERNAL COMBUSTION ENGINE

(75) Inventor: Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/573,702

(22) PCT Filed: Oct. 14, 2004

(86) PCT No.: PCT/IB2004/003353

§ 371 (c)(1), (2), (4) Date: Mar. 27, 2006

(87) PCT Pub. No.: WO2005/038208

PCT Pub. Date: Apr. 28, 2005

(65) Prior Publication Data
US 2006/0272316 A1 Dec. 7, 2006

(30) Foreign Application Priority Data
Oct. 16, 2003 (JP) .............................. 2003-356697

(51) Int. Cl.
F01N 3/00 (2006.01)
(52) U.S. Cl. ............................ 60/301; 60/274; 60/285; 60/297
(58) Field of Classification Search .................. 60/274, 60/285, 286, 295, 297, 301
See application file for complete search history.

(56) References Cited

U.S. PATENT DOCUMENTS

| 5,412,945 | A | 5/1995 | Katoh et al. |
| 5,974,788 | A | 11/1999 | Hepburn et al. |
| 6,105,781 | A | 8/2000 | Ejima et al. |
| 6,199,373 | B1 | 3/2001 | Hepburn et al. |
| 6,216,448 | B1 | 4/2001 | Schnaibel et al. |
| 6,499,294 | B1 | 12/2002 | Katoh et al. |
| 6,502,389 | B2 * | 1/2003 | Katayama et al. ............ 60/285 |
| 6,539,709 | B2 * | 4/2003 | Kubo et al. .................... 60/301 |
| 6,988,359 | B2 * | 1/2006 | Ide et al. ....................... 60/285 |

(Continued)

FOREIGN PATENT DOCUMENTS

EP 1 378 645 A2 1/2004

(Continued)

Primary Examiner—Binh Q. Tran
(74) Attorney, Agent, or Firm—Oliff & Berridge, PLC

(57) ABSTRACT

A converter (70) which houses a NOx storage/reduction catalyst is provided in an exhaust passage (2) of an engine (1). At a front half portion (inlet side portion) (7a) of a carrier of the NOx storage/reduction catalyst in the converter (70), the amount of an oxygen storage component is made less than it is at a rear half portion (outlet side portion) (7b) of the carrier, and a NOx storage capacity is made larger than it is at the rear half portion (7b) of the carrier. As a result, unpurified NOx released from the front half portion (7a) of the carrier at the beginning of a rich spike due to an $O_2$ storage operation is able to be stored in the rear half portion (7b) of the carrier, and so is not exhausted outside the catalyst. Moreover, the amount of HC and CO components in the exhaust gas that are needlessly consumed by the $O_2$ storage operation without being used to purify NOx is reduced, making it possible to purify NOx efficiently.

5 Claims, 5 Drawing Sheets

U.S. PATENT DOCUMENTS

| | | | |
|---|---|---|---|
| 7,162,862 B2 * | 1/2007 | Nagai et al. .................. | 60/285 |
| 2004/0001781 A1 | 1/2004 | Kumar et al. | |
| 2004/0001782 A1 | 1/2004 | Kumar et al. | |

FOREIGN PATENT DOCUMENTS

| | | | |
|---|---|---|---|
| GB | 2 355 944 A | 5/2001 |
| JP | A 4-66716 | 3/1992 |
| JP | A 11-104493 | 4/1999 |
| JP | A 2000-154713 | 6/2000 |
| WO | WO 93/12863 | 7/1993 |

* cited by examiner

EXHAUST GAS CONTROL APPARATUS FOR INTERNAL COMBUSTION ENGINE

BACKGROUND OF THE INVENTION

1. Field of the Invention

The invention relates to an exhaust gas control apparatus for an internal combustion engine, and more specifically to an exhaust gas control apparatus for an internal combustion engine provided with a NOx storage/reduction catalyst.

2. Description of the Related Art

A NOx storage/reduction catalyst is known which stores NOx in the exhaust gas by at least one of adsorption and absorption when the air-fuel ratio of in-flowing exhaust gas is lean, and then reduces and purifies the stored NOx using, for example, HC and reduction components such as CO and $H_2$ (hereinafter these will be collectively termed "reduction components") in the exhaust gas when the air-fuel ratio of the in-flowing exhaust gas is rich.

One such exhaust gas control apparatus for an internal combustion engine that uses this type of NOx storage/reduction catalyst is disclosed in Japanese patent laid open application No. JP(A) 2000-154713.

The apparatus disclosed in this publication improves the NOx purification efficiency of the NOx storage/reduction catalyst by carrying an oxygen storage component on only the front half of a carrier of the NOx storage/reduction catalyst.

When a three-way catalyst is provided in an exhaust passage on the upstream side of the NOx storage/reduction catalyst and that three-way catalyst has an oxygen ($O_2$) storage function, the exhaust gas control performance of the NOx storage/reduction catalyst may decline due to a delay in the change in the air-fuel ratio of the exhaust gas flowing into the NOx storage/reduction catalyst.

As is well known, a three-way catalyst can be made to have an oxygen storage function by carrying on it metal components such as cerium Ce as an auxiliary agent, in addition to a precious metal catalyst component such as platinum Pt, palladium Pd, or rhodium Rh. That is, cerium carried on a catalyst as an additive agent stores oxygen by bonding to the oxygen in the exhaust gas when the air-fuel ratio of the exhaust gas flowing into the catalyst is higher than the stoichiometric air-fuel ratio (i.e., when the air-fuel ratio of the exhaust gas is lean) to produce ceria (cerium oxide IV: $CeO_2$). Further, when the air-fuel ratio of the in-flowing exhaust gas is equal to, or less than, the stoichiometric air-fuel ratio (i.e., the air-fuel ratio of the exhaust gas is rich), the ceria releases the oxygen to produce cerium oxide III ($Ce_2O_3$).

Therefore, in three-way catalyst having an $O_2$ storage function, oxygen is released from the three-way catalyst when the air-fuel ratio of the exhaust gas changes from lean to rich. Even if the air-fuel ratio of the exhaust gas flowing into the three-way catalyst changes to rich, the air-fuel ratio of the exhaust gas passing through the three-way catalyst is maintained near the stoichiometric air-fuel ratio while oxygen is being released from the three-way catalyst.

When the three-way catalyst provided in an exhaust passage on the upstream side of the NOx storage/reduction catalyst has an $O_2$ storage function, even if the air-fuel ratio of the exhaust gas from the engine changes from lean to rich during a rich spike operation of the engine, the air-fuel ratio of the exhaust gas flowing into the NOx storage/reduction catalyst does not immediately become rich, but rather is temporarily maintained near the stoichiometric air-fuel ratio. That is, the reduction components in exhaust gas having a rich air-fuel ratio are oxidized by the oxygen released from the oxygen storage component of the catalyst, such that exhaust gas with an air-fuel ratio near the stoichiometric air-fuel ratio and which contains relatively few reduction components flows into the NOx storage/reduction catalyst.

Meanwhile, NOx is released from the NOx storage/reduction catalyst when the air-fuel ratio of the exhaust gas changes (drops) from a lean air-fuel ratio to an air-fuel ratio near the stoichiometric air-fuel ratio, but the exhaust gas that flows into the NOx storage/reduction catalyst contains only a relatively small amount of reduction components, not enough to reduce the entire amount of NOx that is released. As a result, the NOx that was released from the NOx storage/reduction catalyst and not reduced may flow out from the downstream side of the NOx storage/reduction catalyst.

Because of this, the apparatus disclosed in Japanese laid open application No. JP(A) 2000-154713 improves the NOx purification efficiency of the NOx storage/reduction catalyst by applying the $O_2$ storage function to the front half portion of the NOx storage/reduction catalyst or providing a three-way catalyst having an $O_2$ storage function adjacent to, and on the upstream side of, the NOx storage/reduction catalyst.

Accordingly, by providing the three-way catalyst having an $O_2$ storage function on the upstream side of the NOx storage/reduction catalyst in this apparatus, the reduction components in the exhaust gas are oxidized by oxygen released from the ceria when the air-fuel ratio of the in-flowing exhaust gas is rich. Reaction heat from that reaction raises the temperature of the NOx storage/reduction catalyst component carried on the carrier, which promotes the release of NOx from the NOx storage/reduction catalyst and improves the catalyst activity. This is believed to increase the purification efficiency of the released NOx.

As described above, the apparatus disclosed in Japanese patent laid open application No. JP(A) 2000-154713 improves the purification efficiency of the catalyst by carrying the oxygen storage component on only the front half of the carrier of the NOx storage/reduction catalyst.

However, while having the oxygen storage component carried on only the front half of the catalyst carrier is beneficial for improving catalyst activity by raising the temperature of the catalyst by oxidizing the HC and CO in the exhaust gas when the air-fuel ratio is rich, as described in Japanese patent laid open application No. JP(A) 2000-154713, problems still remain. That is, during the initial period of a change from a lean air-fuel ratio to a rich air-fuel ratio, the reduction components in the exhaust gas end up becoming oxidized by the oxygen released from the oxygen storage component, which results in a shortage of reduction components for reducing and purifying the NOx stored in the NOx storage/reduction catalyst.

On the other hand, in order to solve this problem, it is also possible not to have the oxygen storage component be carried on (either the front half or the back half) of the NOx storage/reduction catalyst carrier, as is done in the related art. However, the NOx storage/reduction catalyst functions as a three-way catalyst that simultaneously purifies three components (HC, CO, NOx) in the exhaust gas in a narrow air-fuel ratio range near the stoichiometric air-fuel ratio. Therefore, when the engine is operated near the stoichiometric air-fuel ratio, in order to eliminate relatively small air-fuel ratio fluctuations near the stoichiometric air-fuel ratio of the exhaust gas and effectively utilize the three-way catalyst function of the NOx storage/reduction catalyst, it is necessary to carry at least a certain amount of the oxygen storage component on the carrier of the NOx storage/reduction catalyst.

That is, even though carrying the oxygen storage component on the NOx storage/reduction catalyst carrier is problematic from the viewpoint of NOx control, in reality it is necessary to carry the oxygen storage component in order to make use of the three-way catalyst function.

SUMMARY OF THE INVENTION

It is an object of this invention to provide an exhaust gas control apparatus for an internal combustion engine able to dramatically improve NOx purification efficiency of a NOx storage/reduction catalyst wherein the NOx storage/reduction catalyst carries on a NOx storage/reduction catalyst carrier, an amount of the oxygen storage component sufficient for the NOx storage/reduction catalyst to function as a three-way catalyst while minimizing the effects from the oxygen storage component.

First aspect of the invention relates to an exhaust gas control apparatus for an internal combustion engine provided with a NOx storage/reduction catalyst provided in an exhaust passage and which stores NOx in exhaust gas by at least one of adsorption and absorption when an air-fuel ratio of in-flowing exhaust gas is lean, and then reduces and purifies the stored NOx using reduction components in the exhaust gas when the air-fuel ratio of the in-flowing exhaust gas is rich includes an upstream side portion of a carrier of the NOx storage/reduction catalyst, which is positioned on an upstream side of an exhaust gas flow, and a downstream side portion of the carrier of the NOx storage/reduction catalyst, which is positioned on the downstream side of the exhaust gas flow. The carrier carries an oxygen storage component that absorbs oxygen in the exhaust gas when the air-fuel ratio of the exhaust gas is lean and releases the absorbed oxygen when the air-fuel ratio of the exhaust gas is rich. Also, the amount of the oxygen storage component on the upstream side portion of the carrier is made less than the amount of the oxygen storage component on the downstream side portion of the carrier.

That is, both the upstream side portion and the downstream side portion carry an oxygen storage component in addition to the NOx storage/reduction catalyst carrier.

According to the invention, the oxygen storage component is carried on the upstream side portion of the carrier of the NOx storage/reduction catalyst. As a result, there is a possibility that the reduction components (such as HC, CO, and $H_2$) in the exhaust gas may be oxidized by oxygen that is released from the oxygen storage component when the air-fuel ratio of the in-flowing exhaust gas changes from lean to rich, and NOx that is stored in the NOx storage/reduction catalyst at the upstream side portion of the carrier may be released without first being purified.

However, because the amount of oxygen storage component carried on the upstream side portion of the carrier is set to a relatively small amount, the oxygen finishes being released from the upstream side portion of the carrier after a short period of time. Thus, after only a small amount of the reduction components has been oxidized (i.e., consumed), no more of the reduction components will be oxidized. Therefore, exhaust gas having a rich air-fuel ratio that includes a sufficient amount of reduction components reaches the upstream side portion of the carrier shortly after the air-fuel ratio is switched, such that all of the released NOx is reduced and purified, thereby preventing unpurified NOx from being released from the upstream side portion of the carrier.

Also, NOx in the exhaust gas usually starts being stored from the upstream side end portion of the NOx storage/reduction catalyst. Therefore, even when the amount of NOx stored on the upstream side portion of the carrier increases, the amount of NOx stored on the downstream side portion of the carrier is relatively low, so there is usually sufficient room with the NOx storage capacity of the downstream side portion of the carrier.

Furthermore, because the amount of the oxygen storage component carried on the downstream side portion of the carrier is set to be a relatively large amount, a sufficient amount of oxygen is stored even after the oxygen storage component on the upstream side portion of the carrier has released its absorbed oxygen.

Therefore, even when unpurified NOx is released from the upstream side portion of the carrier when the air-fuel ratio starts to change from lean to rich, NOx in the exhaust gas can still be stored without the air-fuel ratio at the downstream side portion of the carrier dropping very much. As a result, unpurified NOx released from the upstream side portion of the carrier when the air-fuel ratio starts to change is stored again in the downstream side portion of the carrier and therefore does not flow out from the downstream side of the NOx storage/reduction catalyst.

Also, while the amount of the oxygen storage component stored on the upstream side portion of the carrier is set to be small, the amount of the oxygen storage component stored on the downstream side portion of the carrier is set to be large. As a result, it is possible for a sufficient amount of the oxygen storage component to be carried on the entire NOx storage/reduction catalyst. Accordingly, the NOx storage/reduction catalyst is able to display sufficient performance as a three-way catalyst even during operation near the stoichiometric air-fuel ratio.

According to the first aspect of the invention, it is possible to dramatically improve the NOx purification efficiency of the NOx storage/reduction catalyst by minimizing the adverse effects of the oxygen storage component on the NOx purification and while carrying, on the NOx storage/reduction catalyst carrier, an amount of the oxygen storage component sufficient to make the NOx storage/reduction catalyst function as a three-way catalyst.

In the first aspect of the invention, the NOx storage capacity of the upstream side portion of the carrier may be made greater than the NOx storage capacity of the downstream side portion of the carrier. That is, the NOx storage capacity of the upstream side portion of the carrier may be set relatively large. As a result, a relatively large amount of NOx can be stored, reduced, and purified mainly at the upstream side portion of the carrier, which carries a small amount of the oxygen storage component of the NOx storage/reduction catalyst. Accordingly, it is possible to efficiently reduce and purify the stored NOx with only a small amount of reducing agents and the like consumed by the oxygen storage component at the start (at the beginning of the change from a lean air-fuel ratio to a rich air-fuel ratio) of reduction/purification.

Furthermore, the upstream side portion of the carrier and the downstream side portion of the carrier may be carried at least one of platinum, palladium and rhodium, and the NOx storage capacity of the upstream side portion of the carrier may be made greater than the NOx storage capacity of the downstream side portion of the carrier by changing an amount of at least one of platinum, palladium and rhodium carried on the upstream side de portion of the carrier and the downstream side portion of the carrier. That is, the NOx storage capacity of the upstream side portion of the carrier of the NOx storage/reduction catalyst and the downstream side portion of the carrier of the NOx storage/reduction catalyst can be changed by changing the amount of at least one of platinum, palladium, and rhodium component carried on each of those portions. Most of the NOx components in the exhaust gas of the internal combustion engine are nitrogen monoxide (NO). However, because the NOx storage/reduction catalyst can only store oxides of nitrogen (NOx) in the form of $NO_2$, it first must oxidize the NO to convert it to $NO_2$. Further, because at least one of platinum, palladium, and rhodium functions as an oxidation catalyst in an oxidized atmosphere (i.e., when the air-fuel ratio is lean), NO within the exhaust gas is able to be oxidized to produce $NO_2$.

Accordingly, by changing the amount of at least one of platinum, palladium, and rhodium component carried on the upstream side and downstream side portions of the carrier of the NOx storage/reduction catalyst so as to make the amount of at least one of platinum, palladium, and rhodium on the upstream side portion of the carrier large, for example, the amount of $NO_2$ produced at the upstream side portion of the carrier will increase so that more $NO_2$ is able to be stored per unit volume of the carrier. That is, the NOx storage capacity can be changed by changing the amount of at least one of platinum, palladium, and rhodium carried on the carrier.

Further, the NOx storage capacity of the upstream side portion of the carrier may be made greater than the NOx storage capacity of the downstream side portion of the carrier by changing at least one of a carrier cell shape, a carrier cell size, and a carrier cell number on the upstream side portion of the carrier and the downstream side portion of the carrier. This enables the NOx storage capacity of the upstream side portion of the carrier to be larger than the NOx storage capacity of the downstream side portion of the carrier. That is, the NOx storage capacities of the upstream side portion of the carrier and the downstream side portion of the carrier can be changed by changing at least one of the cell shape, cell size, and cell number of the carrier.

For example, the cell number per unit volume of the carrier can be changed by changing the cell shape (the shape of the cross section of the exhaust gas flow path) of the carrier or by changing the cell size. However, changing the cell number (i.e., the hole ratio) per unit volume enables the amount of catalyst component carried per unit volume of the carrier (i.e., the amount of coating material) to be increased or decreased and still have the same coating thickness on each cell surface.

Accordingly, it is possible to increase the amount of NOx storage/reduction catalyst carried on the upstream side, and therefore increase the NOx storage capacity by, for example, making the shape of the cells of the downstream side portion of the carrier a normal quadrangle and making the shape of the cells of the upstream side portion of the carrier a polygon such as a hexagon, or by increasing the cell density by making the diameter of the cells on the upstream side portion of the carrier smaller than the diameter of the cells on the downstream side portion of the carrier.

In this case as well, the oxygen storage capacity of the upstream side portion of the carrier can be made smaller than the oxygen storage capacity of the downstream side portion of the carrier by, for example, making the amount of oxygen storage component (such as ceria) carried on the upstream side portion of the carrier less than the amount carried on the downstream side portion.

In the first aspect of the invention, the upstream side portion of the carrier and the downstream side portion of the carrier may be provided separately. This is convenient for changing the cell shape or cell size of the carrier when changing the NOx storage capacity.

In the first aspect of the invention, the upstream side portion of the carrier and the downstream side portion of the carrier may be provided integrally.

DETAILED DESCRIPTION OF THE PREFERRED EMBODIMENTS

In the following description and the accompanying drawings, the present invention will be described in more detail in terms of exemplary embodiments.

Figure 1:
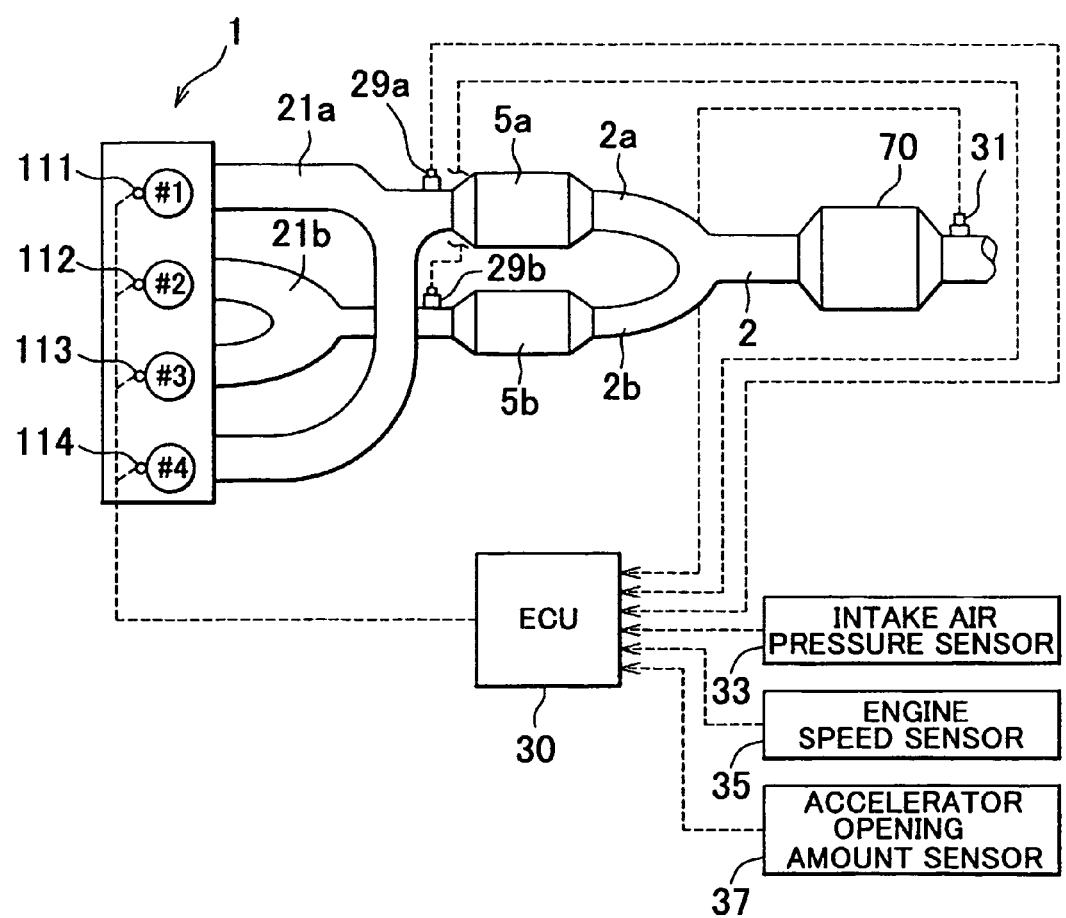
FIG. 1 schematically shows the construction of an exemplary embodiment in which the invention is applied to an internal combustion engine of an automobile.

FIG. 1 schematically shows the construction of an exemplary embodiment in which the invention is applied to an automobile engine.

In the drawing, an internal combustion engine for an automobile (hereinafter simply referred to as "engine") 1 is a four cylinder gasoline engine having four cylinders #1 to #4. Each cylinder #1 to #4 is provided with a fuel injection valve 111 to 114 which injects fuel directly into the cylinder. As will be described later, the engine 1 in this exemplary embodiment is a lean burn engine capable of operating with an air-fuel ratio higher than the stoichiometric air-fuel ratio (i.e., a lean air-fuel ratio).

Also in this exemplary embodiment, the cylinders #1 to #4 are divided into two cylinder groups, each group including two cylinders which do not have sequential ignition timings (i.e., two cylinders that do not fire sequentially). For example, in the exemplary embodiment shown in FIG. 1, the cylinder firing order is 1-3-4-2, so one group includes cylinders #1 and #4 and the other group includes cylinder #2 and #3. Also, an exhaust port of each cylinder in any one group is connected to an exhaust manifold for that cylinder group, which is in turn connected to an exhaust passage for that cylinder group.

In FIG. 1, reference numeral 21a denotes an exhaust manifold in which the exhaust ports of the cylinder group that includes cylinders #1 and #4 are connected to an individual exhaust passage 2a. Likewise, reference numeral 21b denotes an exhaust manifold in which the exhaust ports of the cylinder group that includes cylinders #2 and #3 are connected to an individual exhaust passage 2b. In this exemplary embodiment, three-way catalysts which serve as start catalysts (hereinafter simply referred to as "SCs") 5a and 5b are arranged in the individual exhaust passages 2a and 2b, respectively. Also, these individual exhaust passages 2a and 2b join into a common exhaust passage 2 on the downstream side of the SCs.

A converter 70, in which a NOx storage/reduction catalyst 7, to be described later, is housed in a casing 70a, is provided in the common exhaust passage 2. The construction of this converter 70 will be described later.

As shown in FIG. 1, upstream side air-fuel ratio sensors 29a and 29b are provided on the upstream side of the SCs 5a and 5b in the individual exhaust passages 2a and 2b. A downstream side air-fuel ratio sensor 31 is provided on the downstream side of the converter 70 in the exhaust passage 2. These air-fuel ratio sensors 29a, 29b, and 31 are so-called linear air-fuel ratio sensors that output voltage signals corresponding to the exhaust gas air-fuel ratio over a wide air-fuel ratio range.

An electronic control unit (ECU) 30, which in this exemplary embodiment is a microcomputer of a well known construction including RAM, ROM and a CPU, performs basic controls such as ignition timing control and fuel injection control of the engine 1. Also in this exemplary embodiment, in addition to performing the aforementioned basic controls, the ECU 30 also performs a control to change the operating air-fuel ratio of the engine by changing the fuel injection mode of the in-cylinder injection valves 111 to 114 according to the engine operating state, as will be described later.

Various signals are input into an input port of the ECU 30. For example, signals indicative of the exhaust gas air-fuel ratios on the upstream sides of the SCs 5a and 5b are input from the upstream side air-fuel ratio sensors 29a and 29b; a signal indicative of the exhaust gas air-fuel ratio on the downstream side of the converter 70 is input from the air-fuel ratio sensor 31; a signal corresponding to an intake air pressure of the engine is input from an intake air pressure sensor 33 provided in the engine intake manifold, not shown; and a signal corresponding to the engine speed is input from an engine speed sensor 35 provided near the engine crankshaft (not shown).

Further, according to this exemplary embodiment, a signal indicative of an accelerator depression amount (accelerator opening amount) by a driver is input to the input port of the ECU 30 from an accelerator opening amount sensor 37 positioned near an accelerator pedal, not shown, of the engine 1. Also, an output port of the ECU 30 is connected to the fuel injection valves 111 to 114 of the cylinders via fuel injection circuits, not shown, in order to control the fuel injection quantity and fuel injection timing for each of the cylinders.

Next, the converter 70 according to the exemplary embodiment will be described.

Figure 2:
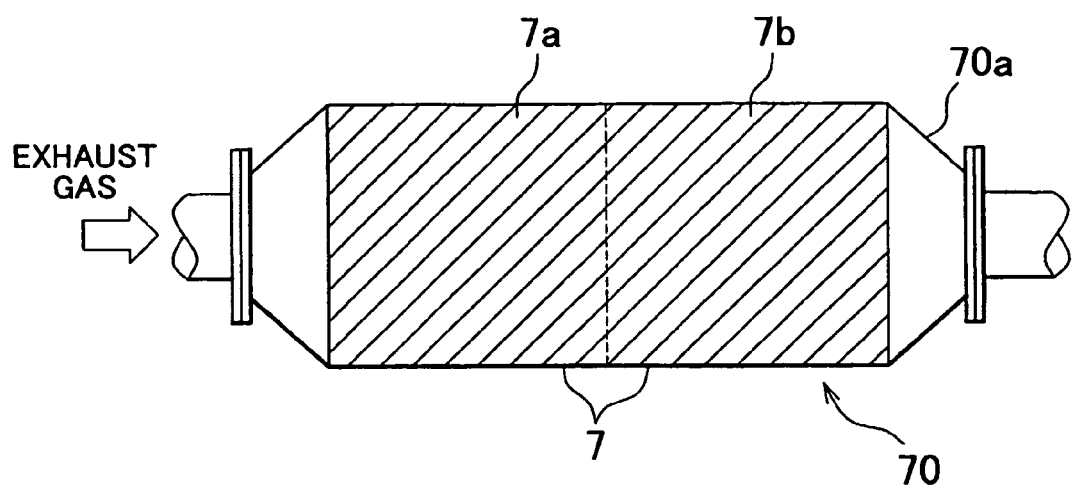
FIG. 2 is a view illustrating one example of a construction of a converter shown in FIG. 1.

FIG. 2 is a sectional view showing the construction of the converter 70 according to the exemplary embodiment. The converter 70 is formed with the NOx storage/reduction catalyst 7 housed in the casing 70a.

The NOx storage/reduction catalyst 7 of the exemplary embodiment uses a carrier of cordierite, for example, having a honeycomb construction, for example, with an alumina coating on its surface. The alumina layer carries a precious metal such as platinum Pt, palladium Pd, and rhodium Rh and at least one component selected from among an alkali metal such as kalium K, natrium Na, lithium Li, and cesium Cs, an alkaline earth metal such as barium Ba and calcium Ca, and a rare-earth metal such as lanthanum La, cerium Ce and yttrium Y. The NOx storage/reduction catalyst performs a NOx absorption/release operation in which it absorbs NOx ($NO_2$ and NO) in the exhaust gas in the form of nitrate ions $NO_3^-$ when the air-fuel ratio of the in-flowing exhaust gas is lean, and releases the absorbed NOx when the oxygen concentration in the exhaust gas drops.

For example, when the engine 1 is operating at a lean air-fuel ratio such that the exhaust gas flowing into the NOx storage/reduction catalyst 7 has a lean air-fuel ratio, the NOx (NO) in the exhaust gas becomes oxidized on, for example, platinum Pt so as to produce $NO_2$, which further oxidizes thus producing nitrate ions. When barium oxide BaO is used as an absorption agent, for example, these nitrate ions become absorbed in the absorption agent and diffuse in the absorption agent in the form of nitrate ions $NO_3^-$ while bonding with the barium oxide BaO. Therefore, in a lean atmosphere, NOx in the exhaust gas will be stored in the form of nitrates.

When the oxygen concentration in the in-flowing exhaust gas decreases drastically (i.e., when the air-fuel ratio of the exhaust gas becomes the stoichiometric air-fuel ratio or a rich air-fuel ratio), the amount of nitrate ions produced on the platinum Pt decreases, resulting in the reaction progressing in the opposite direction, with the nitrate ions $NO_3^-$ in the absorption agent being released therefrom in the form of $NO_2$. In this case, when there are components in the exhaust gas that function as reducing agents, such as CO, HC, and $H_2$, the $NO_2$ is reduced by these components on the platinum Pt.

Also in this exemplary embodiment, in addition to the NOx storage/reduction catalyst component, a metal component such as cerium Ce as an oxygen storage component is also carried on the alumina layer of the carrier, thereby giving the carrier an oxygen ($O_2$) storage function.

The cerium carried on the alumina layer stores oxygen by bonding to the oxygen in the exhaust gas when the air-fuel ratio of the exhaust gas flowing into the catalyst is higher than the stoichiometric air-fuel ratio (i.e., when the air-fuel ratio of the exhaust gas is lean) to produce ceria (cerium oxide IV: $CeO_2$). Further, when the air-fuel ratio of the in-flowing exhaust gas is equal to, or less than, the stoichiometric air-fuel ratio (i.e., the air-fuel ratio of the exhaust gas is rich), the ceria releases the oxygen to produce cerium oxide III ($Ce_2O_3$).

That is, the oxygen storage component performs an $O_2$ storage operation in which it absorbs oxygen in the exhaust gas when the air-fuel ratio of the in-flowing exhaust gas is lean, and releases the absorbed oxygen when the air-fuel ratio of the in-flowing exhaust gas becomes rich.

Therefore, when the air-fuel ratio of the exhaust gas changes from lean to rich, for example, the oxygen storage component releases oxygen, such that even after the air-fuel ratio of the exhaust gas flowing into the catalyst changes to a rich air-fuel ratio, the atmosphere in the catalyst is maintained near the stoichiometric air-fuel ratio without becoming rich while oxygen is being released.

Further, when the air-fuel ratio of the exhaust gas changes the other way, i.e., from rich to lean, the oxygen storage component absorbs oxygen in the exhaust gas, such that even after the air-fuel ratio of the exhaust gas flowing into the catalyst changes to lean, the atmosphere inside the catalyst is maintained near the stoichiometric air-fuel ratio until the oxygen storage component becomes saturated with oxygen.

In this exemplary embodiment, when the amount of NOx absorbed by the NOx storage/reduction catalyst during lean air-fuel ratio operation of the engine 1 increases, a rich spike operation is performed in which the air-fuel ratio is switched for a short time from lean to rich, such that NOx is released from the NOx storage/reduction catalyst and is reduced and purified.

When the oxygen storage component is carried together with the NOx storage/reduction catalyst, even when the air-fuel ratio of the exhaust gas is switched from lean to rich during a rich spike due to an $O_2$ storage operation, reduction components such as CO and $H_2$ in the exhaust gas flowing into the NOx storage/reduction catalyst end up becoming oxidized by the oxygen released from the oxygen storage component, which results in the atmosphere within the NOx storage/reduction catalyst being maintained at an air-fuel ratio near the stoichiometric air-fuel ratio at the beginning of the rich spike.

On the other hand, as the air-fuel ratio drops, NOx is released from the NOx storage/reduction catalyst. Because the reduction components in the exhaust gas flowing into the catalyst end up becoming oxidized by the oxygen released from the oxygen storage component, however, there are not enough reduction components necessary to reduce and purify the released NOx in the catalyst, as described above. Therefore, when a conventional NOx storage/reduction catalyst is made to carry an oxygen storage component, the NOx released from the NOx storage/reduction catalyst at the beginning of the rich spike ends up being released from the downstream side of the catalyst without being reduced, and therefore unpurified, due to the shortage of reduction components.

In order to prevent this, it is possible not to provide the oxygen storage component in the NOx storage/reduction catalyst or on the upstream side thereof so that no oxygen would be released at the beginning of the rich spike. However, in order to improve the performance of the NOx storage/reduction catalyst as a three-way catalyst, it is necessary that the NOx storage/reduction catalyst carry an oxygen storage component.

For example, in a narrow air-fuel ratio range centered around the stoichiometric air-fuel ratio, platinum Pt has the capability of a three-way catalyst, in that it can simultaneously purify three components (HC, CO, and NOx) in the exhaust gas.

Also, like the engine 1 in the exemplary embodiment, in an engine operating over a broad range from a lean air-fuel ratio to a rich air-fuel ratio, there are many opportunities for the engine to operate at the stoichiometric air-fuel ratio. Therefore, in this exemplary embodiment, it is necessary to maximize use of the capability of the NOx storage/reduction catalyst 7 as a three-way catalyst at the stoichiometric air-fuel ratio.

As described above, in order for the NOx storage/reduction catalyst to purify the three components (i.e., HC, CO, and NOx) simultaneously, the air-fuel ratio of the exhaust gas must be in a narrow range centered around the stoichiometric air-fuel ratio. Therefore, even if the air-fuel ratio fluctuates somewhat while the engine 1 is operating at the stoichiometric air-fuel ratio, the $O_2$ storage effect achieved by the exhaust gas storage component is necessary to maintain the atmosphere inside the NOx storage/reduction catalyst near the stoichiometric air-fuel ratio and display the three-way capability.

Therefore, conventionally, in order to effectively utilize the three-way capability of a NOx storage/reduction catalyst, a certain amount of an oxygen storage component is carried together with the NOx storage/reduction catalyst on the carrier. As described above, however, the oxygen storage component results, for example, in unpurified NOx components being released at the beginning of a rich spike operation, such that the overall NOx purification efficiency is unable to be improved.

This exemplary embodiment solves this problem by dividing the catalyst carrier into an upstream side portion (front half) 7a and a downstream side portion (back half) 7b and changing the $O_2$ storage capacity and the NOx storage capacity of each carrier portion.

That is, in this exemplary embodiment, the relationship between the $O_2$ storage capacities and the NOx storage capacities of the upstream side portion 7a and the downstream side portion 7b are set as follows.

(1) The $O_2$ storage capacity of the upstream side portion 7a is less than the $O_2$ storage capacity of the downstream side portion 7b.

(2) The NOx storage capacity of the upstream side portion 7a is greater than the NOx storage capacity of the downstream side portion 7b.

The effects of each are as follows.

(1) An effect is achieved by setting the $O_2$ storage capacity (OSC) of the upstream side portion 7a less than the $O_2$ storage capacity of the downstream side portion 7b.

The effects achieved by making the oxygen storage capacity of the upstream side portion 7a less than the oxygen storage capacity of the downstream side portion 7b are as follows.

That is, when the NOx storage/reduction catalyst absorbs NOx in the exhaust gas, the storage amount increases from the upstream side portion first. Therefore, even when the amount of NOx stored at the upstream side portion reaches a certain value such that a rich spike is executed, the amount of NOx stored at the downstream side portion is usually relatively small so there is still sufficient room to store NOx there.

When a rich spike is executed in this state, reduction components in the exhaust gas are consumed at the beginning of the rich spike due to the oxygen storage capacity (OSC) described above, so NOx released at the upstream side portion of the catalyst flows into the downstream side portion without being purified.

Because the OSC of the downstream side portion is relatively large so that a relatively large amount of oxygen is released, the air-fuel ratio there does not drop much. Also, because the amount of NOx absorbed at the downstream side portion is less than it is at the upstream side portion, as described above, there is still sufficient room to store NOx there.

Accordingly, the unpurified NOx that flows out from the upstream side portion is stored in the NOx storage/reduction catalyst, which prevents it from flowing out from the downstream side of the catalyst.

On the other hand, because the OSC of the upstream side portion is small, the reduction components in the exhaust gas are only consumed by the released oxygen for a short period of time, such that a sufficient amount of reduction components can be supplied inside the NOx storage/reduction catalyst thereafter. As a result, the NOx is released and reduced and purified in sequence from the upstream side portion of the NOx storage/reduction catalyst.

That is, the exemplary embodiment achieves the following: a) by making the OSC of the downstream side portion of the NOx storage/reduction catalyst large, unpurified NOx released from the upstream side portion of the NOx storage/reduction catalyst at the beginning of a rich spike is re-stored at the downstream side portion and thus prevented from flowing out at the downstream side, and b) by making the OSC of the upstream side portion of the NOx storage/ reduction catalyst small, the amount of oxygen released at the beginning of the rich spike is reduced so the amount of unpurified NOx released from the upstream side portion is less. Moreover, the amount of reduction components in the exhaust gas needlessly consumed that are not used to purify NOx is reduced, making it possible to purify NOx efficiently.

When all of the NOx stored in the upstream side portion is reduced and purified during a rich spike, the reduction components such as CO and HC in the exhaust gas pass through the upstream side portion and flow into the downstream side portion. In order to prevent unpurified HC and CO and the like from flowing out of the downstream side of the catalyst, there was conventionally a need to end the rich spike before all of the NOx stored in the NOx storage/reduction catalyst is reduced, i.e., before the NOx storage amount reaches zero.

In contrast, according to this exemplary embodiment, because the OSC of the downstream side portion is set large, even if exhaust gas containing large amounts of HC and CO flows from the upstream side portion of the NOx storage/reduction catalyst into the downstream side portion thereof, that HC and CO are able to be purified by the oxygen released from the downstream side portion so no unpurified HC or CO flows out from the NOx storage/reduction catalyst. Therefore, according to this exemplary embodiment, a rich spike is able to be performed until the NOx storage amount of the upstream side portion completely reaches zero without unpurified HC and CO and the like flowing out, thereby enabling NOx to be purified efficiently.

Also, in this exemplary embodiment, even though the OSC of the upstream side portion is less than it is conventionally, it is possible to make the OSC of the downstream side greater than it is conventionally. Therefore, the OSC of the overall NOx storage/reduction catalyst can be set equal to, or greater than, what it is conventionally set to without a decline in the purification efficiency of the NOx, such that it is possible to effectively utilize the three-way catalyst capability of the NOx storage/reduction catalyst near the stoichiometric air-fuel ratio.

(2) An effect is achieved by making the NOx storage capacity of the upstream side portion 7a greater than the NOx storage capacity of the downstream side portion 7a.

As described above, by making the NOx storage capacity of the upstream side portion 7a greater than the NOx storage capacity of the downstream side portion 7b, in addition to making the $O_2$ storage capacity of the upstream side portion 7a less than the $O_2$ storage capacity of the downstream side portion 7b, the exemplary embodiment achieves the following effects.

That is, as described above, with the NOx storage/reduction catalyst according to the exemplary embodiment, the OSC of the upstream side portion is set small so the amount of reduction components in the exhaust gas that are needlessly consumed at the beginning of a rich spike is relatively small. Also, in the upstream side portion, it is possible to completely purify the stored NOx without exhausting unpurified HC and CO components outside the catalyst. Accordingly, it is possible to reduce and purify stored NOx far more efficiently than normal at the upstream side portion.

Therefore, by setting the NOx storage capacity (i.e., the amount of NOx able to be stored per unit volume of the carrier) of the upstream side portion larger than the NOx storage capacity of the downstream side portion, it is possible to purify primarily NOx in the exhaust gas at the upstream side portion where NOx can be purified efficiently, and thus possible to drastically improve overall NOx purification efficiency compared with conventional technology.

Figure 3:
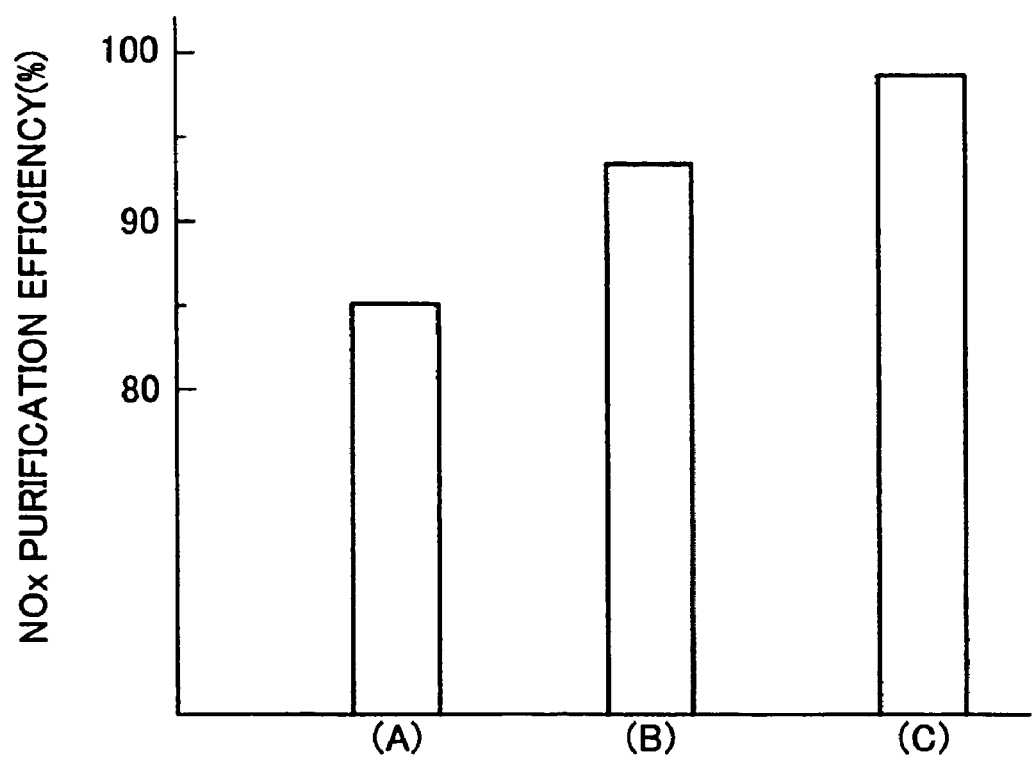
FIG. 3 is a view illustrating the NOx purification efficiency of a NOx storage/reduction catalyst according to this exemplary embodiment.

FIG. 3 is a graph showing a change in the NOx purification efficiency (i.e., the amount of NOx in the exhaust gas flowing out of the catalyst divided by the amount of NOx in the exhaust gas flowing into the catalyst) between (A) a conventional NOx storage/reduction catalyst having a uniform OSC and NOx storage capacity distribution over the entire catalyst carrier, (B) a case in which the OSC of the upstream side portion of the carrier is set to be less than the OSC of the downstream side portion (in the case of (1) above), and (C) a case in which, in addition to the OSC of the upstream side portion of the carrier being set to less than the OSC of the downstream side portion, the NOx storage capacity of the upstream side portion of the carrier is set to be greater than the NOx storage capacity of the downstream side portion (in the case of (2) above).

The vertical bars in FIG. 3 show the overall NOx purification efficiency in each of the above cases when a rich spike is performed each time the NOx storage amount of the NOx storage/reduction catalyst reaches a predetermined amount (800 mg).

As shown in the drawing, in the case of (A) with the conventional NOx storage/reduction catalyst having a uniform OSC and NOx storage capacity distribution over the entire catalyst carrier, the overall NOx purification efficiency is relatively low. Compared to this, in the case of (B) in which the OSC of the upstream side portion of the carrier is set to be small, the overall NOx purification efficiency improves. Furthermore, in the case of (C) in which the NOx storage capacity of the upstream side portion is set large in addition to the OSC of the upstream side portion of the carrier being set small, the NOx purification efficiency improves drastically.

Figure 4:
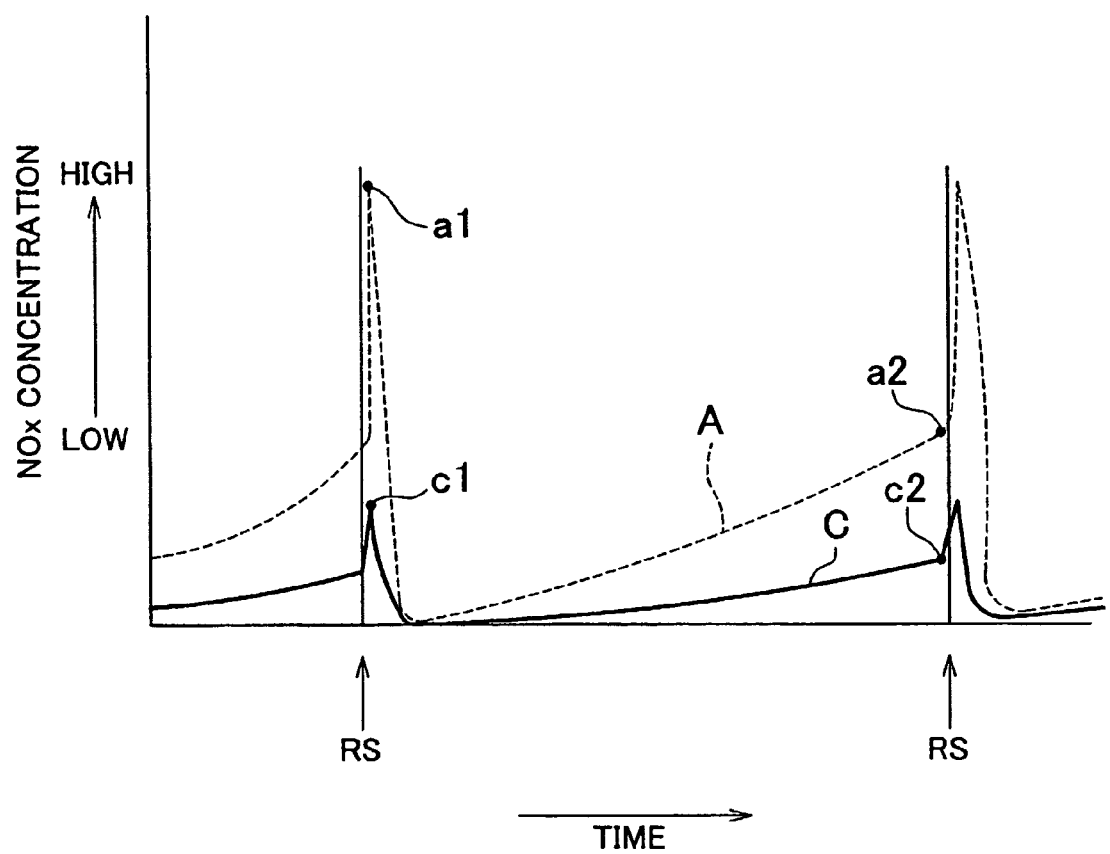
FIG. 4 is a view illustrating the change over time in NOx concentration in exhaust gas at the outlet of the NOx storage/reduction catalyst according to the exemplary embodiment.

In addition, FIG. 4 shows a change in the concentration of NOx in the exhaust at the outlet of the NOx storage/reduction catalyst under actual use conditions. In the graph, the horizontal axis indicates time and the vertical axis indicates the NOx concentration at the outlet of the NOx storage/reduction catalyst. Lines indicated by the letters "RS" indicate the timing at which the rich spike operation is executed (a rich spike lasting for 1 second is repeated every 60 seconds in the example shown in FIG. 4).

In FIG. 4, broken line A shows the conventional NOx storage/reduction catalyst having a uniform OSC and NOx storage capacity distribution over the entire catalyst carrier, and solid line C shows the NOx storage/reduction catalyst in which the OSC of the upstream side portion of the carrier is set smaller than the OSC of the downstream side portion and the NOx storage capacity of the upstream side portion is set larger than the NOx storage capacity of the downstream side portion (in the case of C in FIG. 3).

With the conventional NOx storage/reduction catalyst (broken line A), when a rich spike is executed, a relatively large amount of unpurified NOx is released at the beginning of the rich spike due to the effect of the OSC (shown by a1 in FIG. 4). Further, when the NOx starts to be stored after the rich spike ends, the NOx concentration at the outlet of the NOx storage/reduction catalyst does decrease, but because the stored NOx amount does not completely become zero even when the rich spike ends, the NOx concentration at the outlet increases in a relatively short time such that it ends up being relatively high (a2 in FIG. 4) right before the start of the next rich spike.

In contrast, in the exemplary embodiment (solid line C), because the OSC of the upstream side portion of the carrier is set low, and amount of unpurified NOx released at the beginning of a rich spike is small. Further, because the OSC of the downstream side portion is set large, the unpurified NOx that is released from the upstream side portion is stored again in the downstream side portion, preventing it from flowing out of the catalyst. As a result, the unpurified NOx that is released at the beginning of a rich spike is dramatically reduced (c1 in FIG. 4).

Also in this exemplary embodiment, it is possible to effectively use the reduction components in the exhaust gas even if the rich spike timing is the same because the OSC of the upstream side portion is set low, such that the amount of NOx stored in the NOx storage/reduction catalyst after the rich spike is less than it is conventionally. Furthermore, by setting the NOx storage capacity of the upstream side portion large, NOx can be purified efficiently using mainly that upstream side portion. As a result, the amount of increase in the NOx concentration at the outlet after a rich spike is reduced such that NOx concentration right before the start of the next rich spike is dramatically low (c2 in FIG. 4).

The OSC (oxygen storage capacity) can be easily changed by changing the amount of the oxygen storage component (such as ceria) carried on the carrier. Therefore, it is easily possible to make the OSC of the upstream side portion smaller than the OSC of the downstream side by, for example, decreasing the amount of ceria carried on the upstream side portion of the carrier and increasing the amount of ceria carried on the downstream side portion of the carrier. Also, the total amount of ceria carried on the upstream side and downstream side portions is set to an amount sufficient for enabling the NOx storage/reduction catalyst 7 to function as a three-way catalyst near the stoichiometric air-fuel ratio.

Further, one way to increase the NOx storage capacity at the upstream side portion of the carrier, for example, is to increase the amount of platinum carried on that portion. Another way is to change the cell concentration on the upstream side portion and the downstream side portion by changing either the number or the shape of cells on the upstream side portion and downstream side portion, if possible.

As described above, the NOx storage/reduction catalyst is capable of storing NOx only in the form of $NO_2$. Because most of the NOx in the exhaust gas is NO, the concentration of $NO_2$ in the exhaust gas directly affects the amount of NOx stored in the NOx storage/reduction catalyst. The NOx storage/reduction catalyst converts NOx into a storable form by oxidizing NO with the platinum component. Accordingly, by increasing the amount of platinum carried on the upstream side portion, the catalyst is able to convert more NO into $NO_2$ at that portion. As a result, more NOx is able to be stored on the upstream side portion of the NOx storage/reduction catalyst. That is, by increasing the amount of platinum component carried on the upstream side portion, it possible to increase the NOx storage capacity of that upstream side portion.

Further, the NOx storage capacity can be changed by changing not only the amount of platinum carried on the carrier, as described above, but also the number of cells (i.e., the cell density) per unit volume of the carrier. That is, increasing the cell density increases the amount of coating material per unit volume, even though the thickness of the wash-coat is the same. More coating material per unit volume results in a greater NOx storage capacity.

One typical method used to increase the cell density is to make the size of the individual cells smaller and increase the number of cells. However, it is also possible, for example, to change the cell shape from quadrilateral in cross section to hexagonal in cross section so as to increase the effective area per predetermined amount of coating material.

In the foregoing exemplary embodiment, a single catalyst carrier is divided into two sections, i.e., a front half portion and a back half portion, as shown in FIG. 2, and the OSC and NOx storage capacities of each are changed. The invention is not limited to this exemplary embodiment, however. For example, the catalyst carrier may be divided into three or more sections and the OSC and NOx storage capacities changed for each section from the upstream side of the carrier toward the downstream side of the carrier, or the OSC and the NOx storage capacities may be changed sequentially from the upstream side end portion of the carrier to the downstream side end portion of the carrier.

Figure 5:
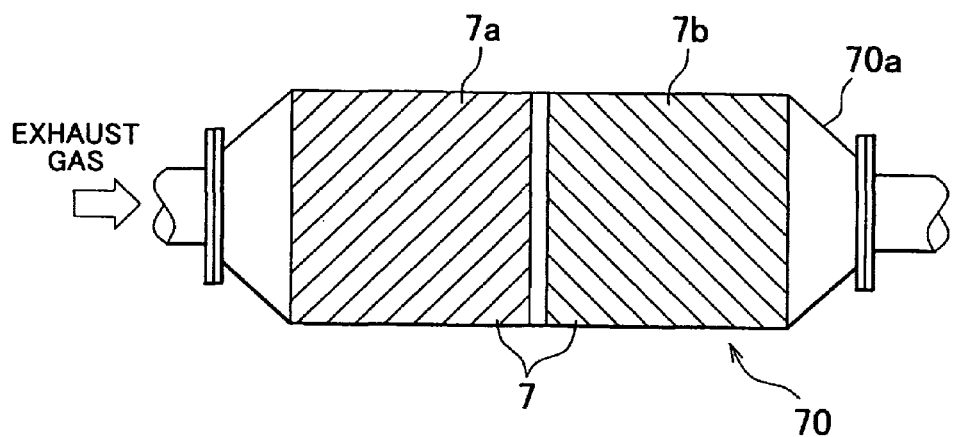
FIG. 5 is a view of another example of a construction of a converter that is different from the example shown in FIG. 1.

Furthermore, the carrier in the example in FIG. 2 is formed of a single unit. However, the upstream side portion 7a and the downstream side portion 7b may also be formed separately and housed in the same converter casing, as shown in FIG. 5, for example. Alternatively, the upstream side portion and the downstream side portion may be housed in separate casings, as shown in FIG. 6.

Figure 6:
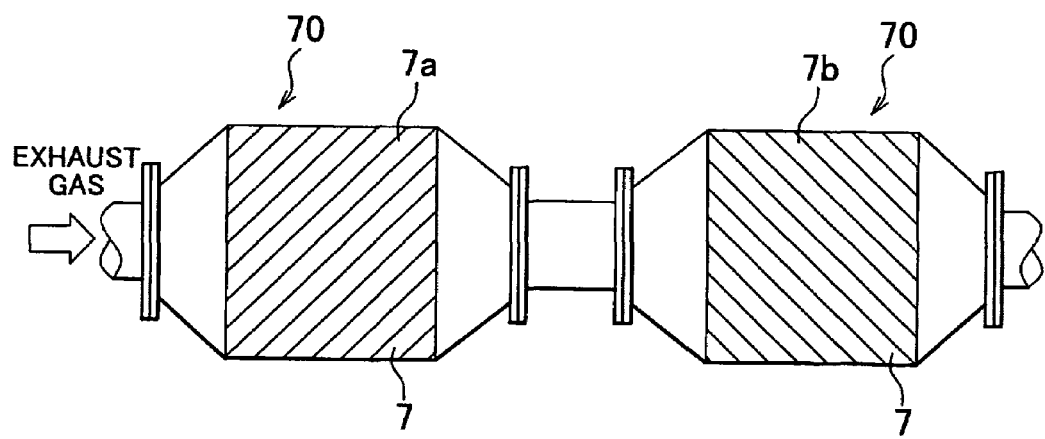
FIG. 6 is a view of yet another example of a construction of a converter that is different from the examples shown in FIG. 1 and FIG. 5.

In particular, when the NOx storage capacity is changed by changing the shape or size of the cells of the carrier, it is especially preferable to form the upstream side portion and the downstream side portion of the carrier separately, as shown in FIGS. 5 and 6.

The converter 70 which houses the NOx storage/reduction catalyst is provided in the exhaust passage 2 of the engine 1. At the front half portion (inlet side portion) 7a of the carrier of the NOx storage/reduction catalyst in the converter 70, the amount of an oxygen storage component is made less than it is at the rear half portion (outlet side portion) 7b of the carrier, and a NOx storage capacity is made larger than it is at the rear half portion 7b of the carrier. As a result, unpurified NOx released from the front half portion 7a of the carrier at the beginning of a rich spike due to an $O_2$ storage operation is able to be stored in the rear half portion 7b of the carrier, and so is not exhausted outside the catalyst. Moreover, the amount of HC and CO components in the exhaust gas that are needlessly consumed by the $O_2$ storage operation without being used to purify NOx is reduced, making it possible to purify NOx efficiently.

The invention claimed is:

1. An exhaust gas control apparatus for an internal combustion engine, comprising:
a NOx storage/reduction catalyst provided in an exhaust passage and which stores NOx in exhaust gas by at least one of adsorption and absorption when an air-fuel ratio of in-flowing exhaust gas is lean, and then reduces and purifies the stored NOx using reduction components in the exhaust gas when the air-fuel ratio of the in-flowing exhaust gas is rich, wherein:
an upstream side portion of a carrier of the NOx storage/reduction catalyst, is positioned on an upstream side of an exhaust gas flow, and a downstream side portion of the carrier of the NOx storage/reduction catalyst, is positioned on the downstream side of the exhaust gas flow;
the carrier carries an oxygen storage component that absorbs oxygen in the exhaust gas when the air-fuel ratio of the exhaust gas is lean and releases the absorbed oxygen when the air-fuel ratio of the exhaust gas is rich;
the amount of the oxygen storage component on the upstream side portion of the carrier is made less than the amount of the oxygen storage component on the downstream side portion of the carrier; and a NOx storage capacity of the upstream side portion of the carrier is made greater than the NOx storage capacity of the downstream side portion of the carrier.

2. The exhaust gas control apparatus according to claim 1, characterized in that the upstream side portion of the carrier and the downstream side portion of the carrier carry at least one of platinum, palladium and rhodium, and the NOx storage capacity of the upstream side portion of the carrier is made greater than the NOx storage capacity of the downstream side portion of the carrier by changing an amount of at least one of platinum, palladium and rhodium carried on the upstream side portion of the carrier and the downstream side portion of the carrier.

3. The exhaust gas control apparatus according to claim 1, characterized in that the NOx storage capacity of the upstream side portion of the carrier is made greater than the NOx storage capacity of the downstream side portion of the carrier by changing at least one of a carrier cell shape, a carrier cell size, and a carrier cell number on the upstream side portion of the carrier and the downstream side portion of the carrier.

4. The exhaust gas control apparatus according to claim 1, characterized in that the upstream side portion of the carrier and the downstream side portion of the carrier are provided separately.

5. The exhaust gas control apparatus according to claim 1, characterized in that the upstream side portion of the carrier and the downstream side portion of the carrier are provided integrally.

* * * * *